F. MÜLLER.

RELIEVING LATHE.

APPLICATION FILED FEB. 11, 1920.

Reissued July 19, 1921.

15,157.

5 SHEETS—SHEET 1.

INVENTOR
Friederich Müller
BY S. Jay Teller
ATTORNEY

F. MÜLLER.
RELIEVING LATHE.
APPLICATION FILED FEB. 11, 1920.
Reissued July 19, 1921.
15,157.
5 SHEETS—SHEET 2.
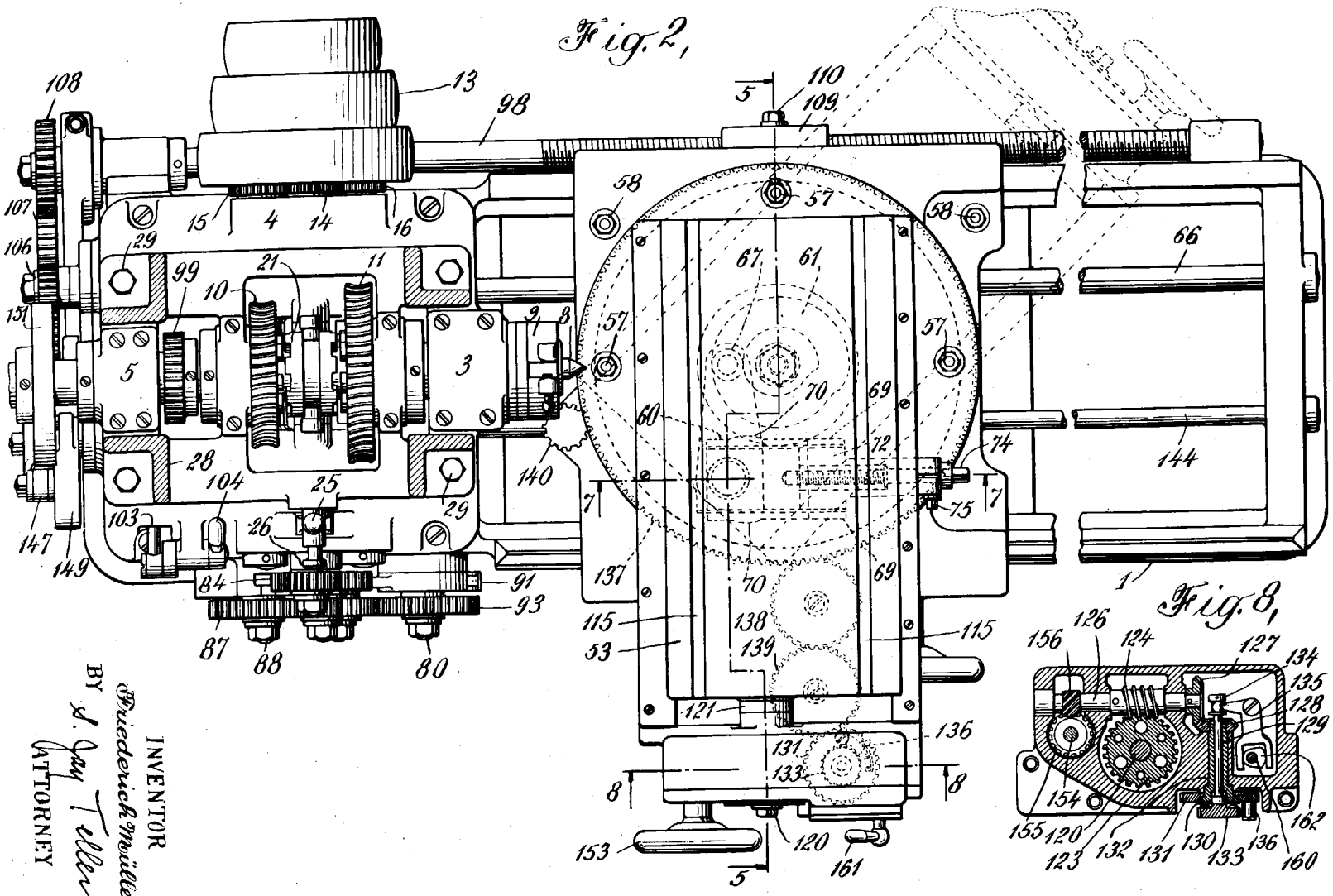
INVENTOR
Friederich Müller
BY S. Jay Teller
ATTORNEY F. MÜLLER.
RELIEVING LATHE.
APPLICATION FILED FEB. 11, 1920.
Reissued July 19, 1921.
15,157.
5 SHEETS—SHEET 3.
Fig. 3,
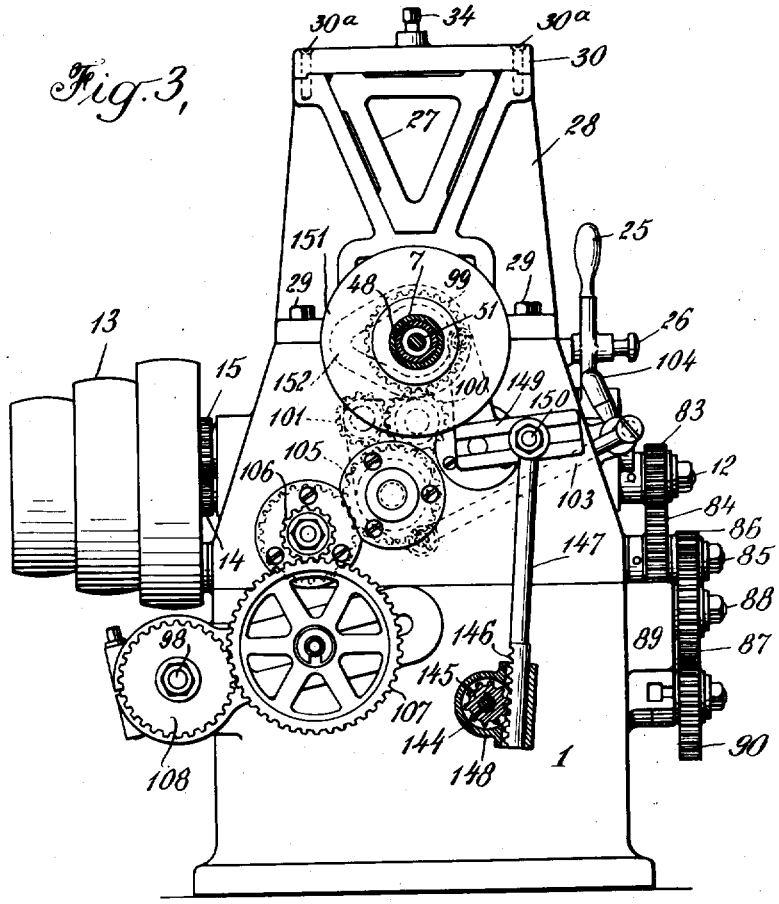
Fig. 4,
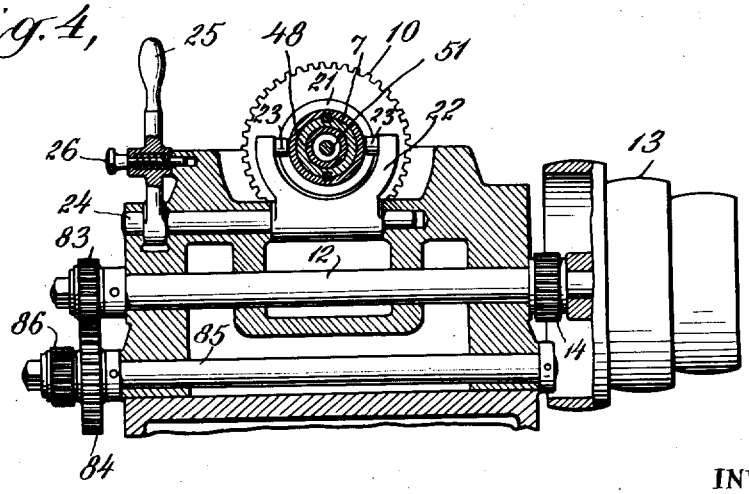
INVENTOR
Friederich Müller
BY S. Jay Teller
ATTORNEY F. MÜLLER.
RELIEVING LATHE.
APPLICATION FILED FEB. 11, 1920.
Reissued July 19, 1921.
15,157.
5 SHEETS—SHEET 4.
Fig. 5,
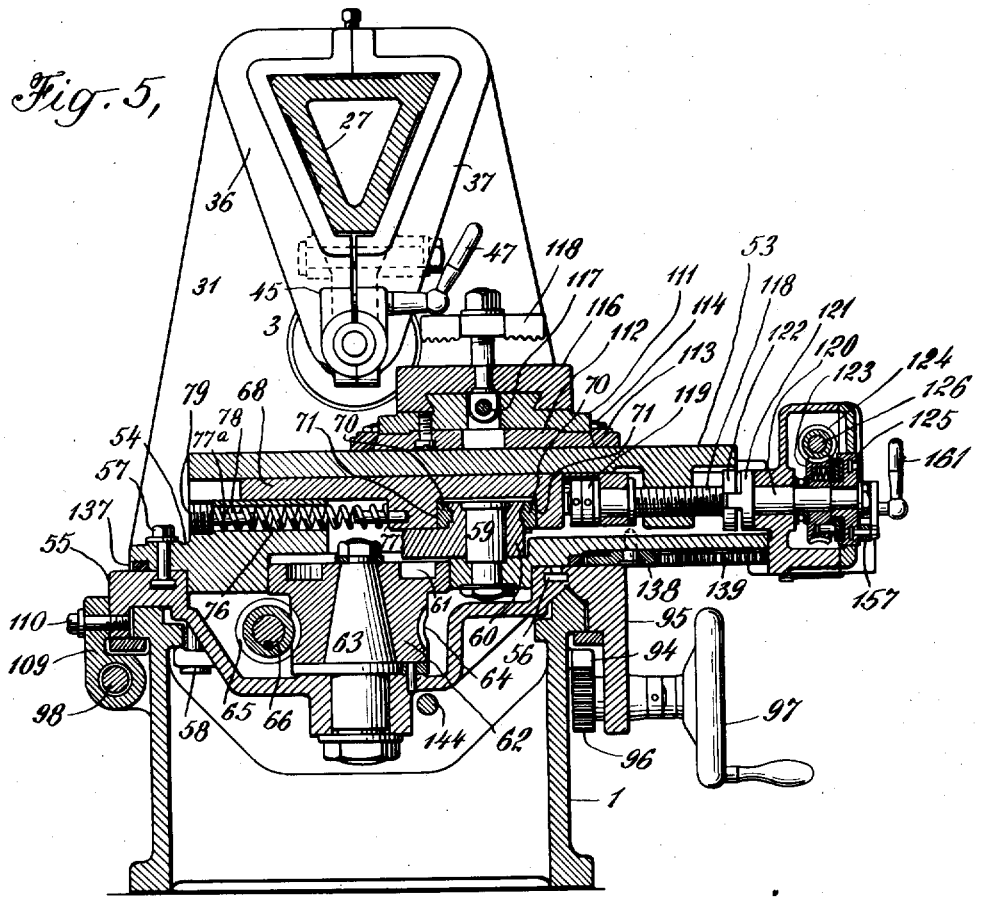
Fig. 7,
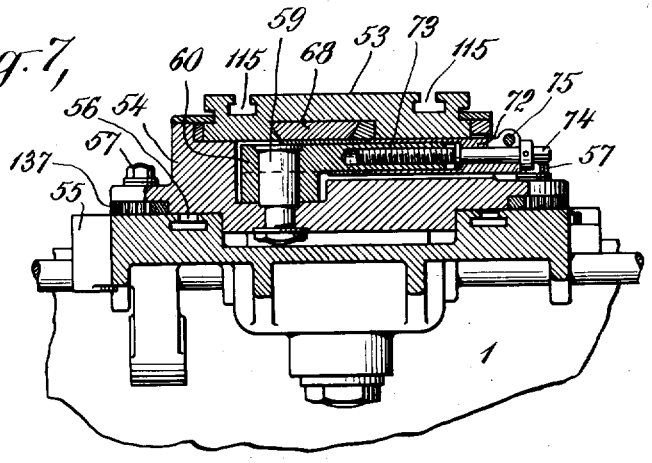
INVENTOR
Friederich Müller
BY S. Jay Teller
ATTORNEY F. MÜLLER.
RELIEVING LATHE.
APPLICATION FILED FEB. 11, 1920.
Reissued July 19, 1921.
15,157.
5 SHEETS—SHEET 5.
Fig. 6,
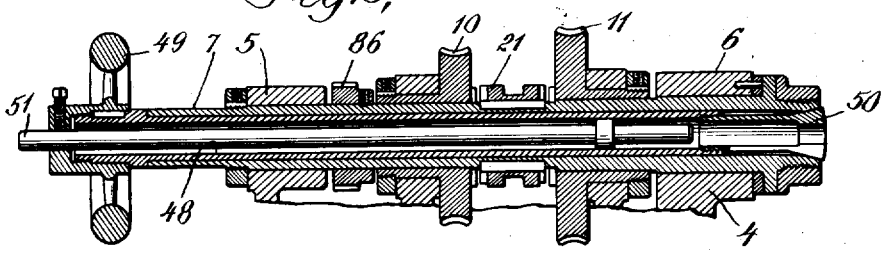
Fig. 9,
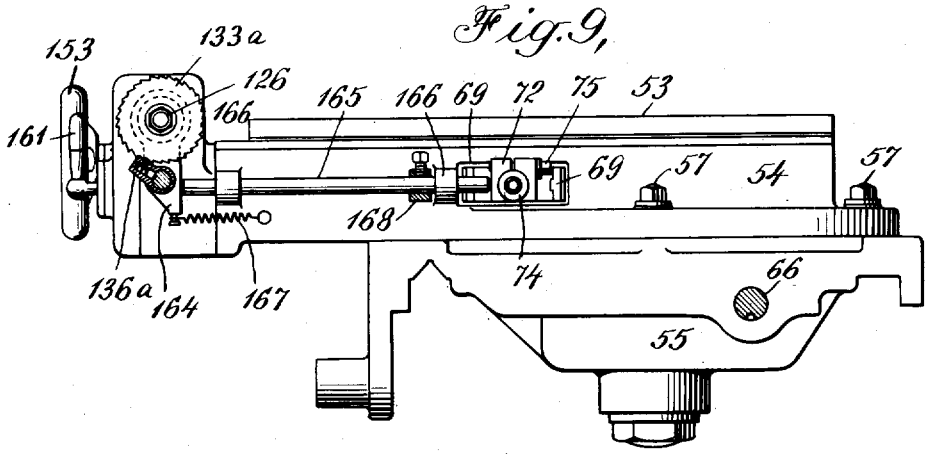
Fig. 10,
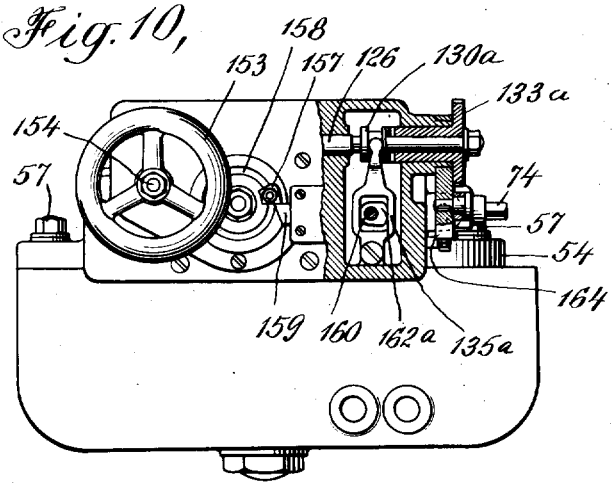
INVENTOR
Friederich Müller
BY S. Jay Teller
ATTORNEY

UNITED STATES PATENT OFFICE.

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

RELIEVING-LATHE.

15,157. Specification of Reissued Letters Patent. Reissued July 19, 1921.

Original No. 1,299,207, dated April 1, 1919, Serial No. 139,838, filed December 30, 1916. Application for reissue filed February 11, 1920. Serial No. 357,831.

*To all whom it may concern:*

Be it known that I, FRIEDERICH MÜLLER, a citizen of the United States, residing at Hartford, in the county of Hartford and State of Connecticut, have invented certain new and useful Improvements in Relieving-Lathes, of which the following is a specification.

The invention relates particularly to lathes for relieving reamers, taps, milling cutters, counter bores and other metal working cutters. However, the machine is not limited for use upon cutters of the kinds mentioned and can be used in practically all cases in which relieving movements of the cutting tool are required. For the sake of convenience the term "cutters" is used throughout this specification, but it will be understood that the term is intended to include not only rotary metal working tools but also any other articles for which relief is required.

One of the objects of the invention is to provide an improved mechanism for actuating the cutting tool to give the required relieving movements thereto, the said mechanism preferably permitting easy adjustment of the extent of the said movements.

Another object of the invention is to provide an improved automatic means whereby the cutting tool can be fed, preferably intermittently, so as to take a fresh chip at each revolution of the cutter; and, stated more specifically, the said object of the invention is to provide an automatic feeding mechanism having certain improved features whereby the rate of feed can be adjusted, whereby the extent of feed can be limited, whereby preliminary adjustments of the tool can be readily effected manually, and whereby other novel and important results can be accomplished.

Another object of the invention is to provide in combination with the improved tool actuating mechanism, or with the improved feeding mechanism, or with both, a construction permitting the angular adjustment horizontally of the tool holding and supporting elements whereby the angle of approach of the tool to the cutter may be varied as required.

A further object of the invention is to provide in a machine of the character set forth, an improved mechanism for driving the live spindle and for supplying power to the devices which operate the cutting tool.

A still further object of the invention is to provide in a machine of the character set forth, an improved tailstock and mounting therefor, which permit the free movement of the cutting tool and its holding and supporting elements.

Additional objects will be apparent from the following specification and the claims.

In the accompanying drawings I have shown in detail a machine embodying the invention, and in the following specification this machine will be described in detail in order that one embodiment of the invention may be clearly understood. I desire, however, to point out that the invention can be embodied in other ways and that the said drawings and description are to be understood merely as illustrative and not as defining or limiting the scope of the invention, the accompanying claims being relied upon for that purpose. I desire particularly to state that certain features of the invention can be used without other features thereof and that for certain classes of work many of the elements herein shown and described can be advantageously omitted. It will be understood that a machine thus modified or simplified falls within the scope of this invention, particularly as set forth in certain of the claims.

Of the drawings:

Fig. 2 is a plan view. In this view the tool holder, the tailstock with its support and other parts are omitted for the sake of clearness.

Fig. 3 is a left end elevation.

Fig. 4 is a transverse sectional view taken along the line 4—4 of Fig. 1.

Fig. 5 is a transverse sectional view taken along the line 5—5 of Fig. 2.

Fig. 6 is a longitudinal sectional view of a spindle construction that may be used.

Fig. 7 is a fragmentary sectional view taken along the line 7—7 of Fig. 2.

Fig. 8 is a longitudinal sectional view taken along the line 8—8 of Fig. 2.

Fig. 9 is a fragmentary right end elevation, with parts in section, showing an alternate form of feed mechanism.

Fig. 10 is a fragmentary front elevation, with parts in section, of the mechanism shown in Fig. 9.

Figure 1:
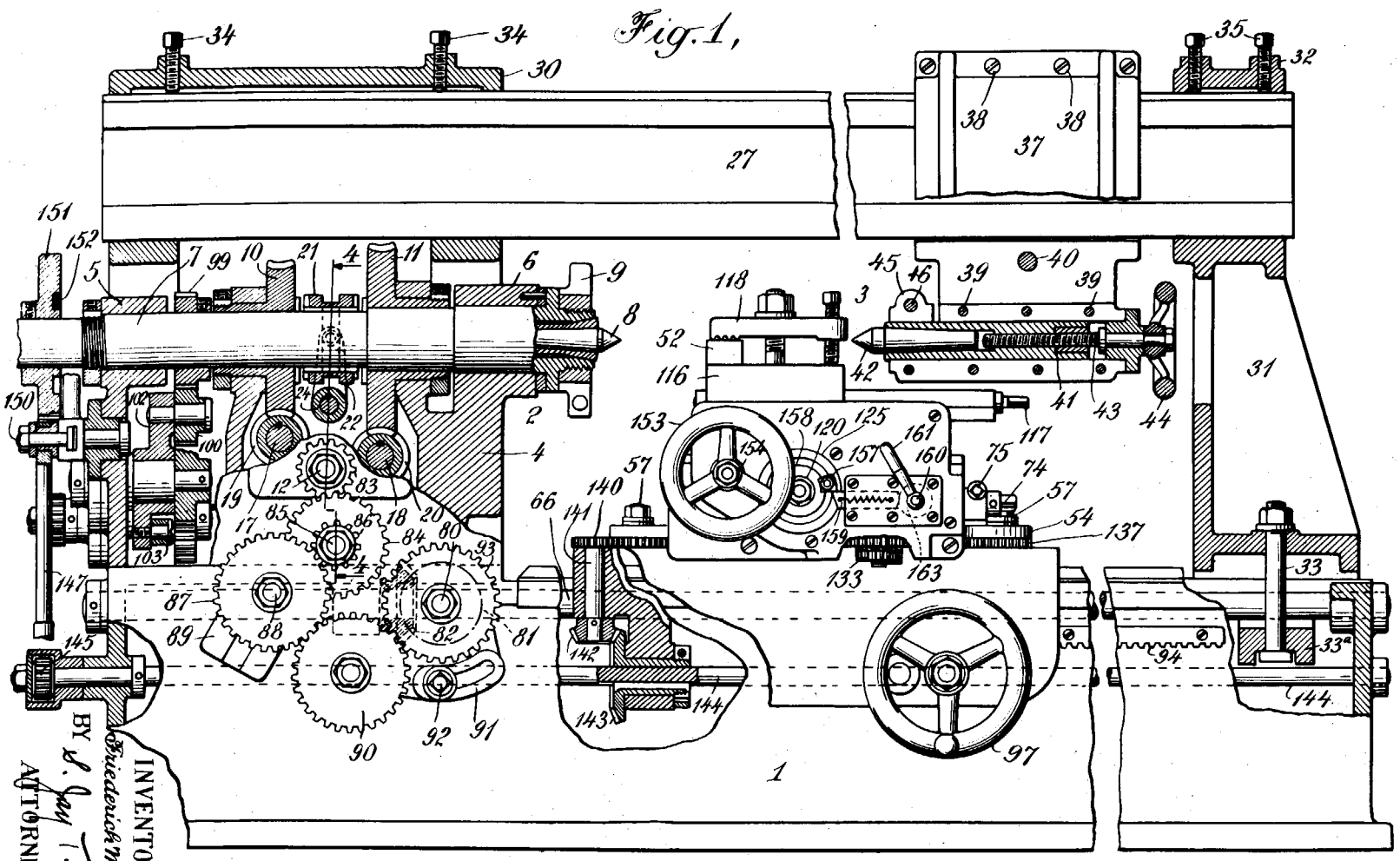
Figure 1 is a side elevation, certain of the parts being shown in section.

Referring to the drawings, 1 represents the main base or bed upon which the other parts of the machine are mounted. Means are provided for holding and rotating a cutter to be relieved, this means preferably comprising a headstock 2 and a tailstock 3, each provided with a center. It will be understood, however, that the invention in its broader phases is not limited to the particular construction shown, and that the cutter may, if preferred, be otherwise held, as for instance by a chuck or collet.

The headstock is provided with a frame casting 4 rigidly secured to the bed. This casting is provided with suitable bearings 5 and 6 in which there is rotatably mounted a live spindle 7, which preferably carries a center 8 and a face plate 9.

Loosely mounted on the spindle 7 are two worm wheels 10 and 11. Preferably, as indicated in Fig. 2, the teeth of the worm wheel 10 are adapted to mesh with a double-threaded worm, and the teeth of the worm wheel 11 are adapted to mesh with a single-threaded worm. Extending transversely of the headstock and mounted in suitable bearings in the casting 4, is a drive shaft 12 provided at its rear end with a driving means, here shown in the form of a set of cone belt pulleys 13. Secured on the drive shaft 12, preferably adjacent the belt pulleys, is a pinion 14 which meshes with pinions 15 and 16 mounted respectively on suitably mounted transverse shafts 17 and 18. Mounted respectively on the shafts 17 and 18 are worms 19 and 20 which mesh respectively with the aforesaid worm wheels 10 and 11. When the worm wheels are constructed as already described, the worm 19 is provided with double threads and the worm 20 with a single thread. It will be seen that the construction is such that when the worms 19 and 20 are rotated the worm wheels will be given different rotative speeds, the wheel 10 in this case having a speed considerably in excess of that of the wheel 11.

Splined to the spindle between the worm wheels 10 and 11 is a clutch element 21 having teeth at each side adapted respectively to mesh with similar teeth formed on the worm wheels. It will be seen that by means of this clutch element either of the worm wheels can be operatively connected with the spindle.

For moving the clutch element 21 longitudinally of the spindle, there is provided an oscillatory lever 22 provided with pins or projections 23, 23 fitting in a circumferential groove in the clutch element. The lever 22 is secured to a transverse rock shaft 24 provided with an operating lever 25. It will be seen that by means of the lever 25 the clutch element 21 can be controlled so as to be maintained in neutral position as shown in Fig. 1, or moved into engagement with either of the worm wheels 10 or 11. The lever 25 is provided with a spring-pressed pin 26 adapted to enter suitable holes in the casting 4 and thus lock the lever and the clutch element in the desired position.

The tailstock 3 is so mounted that it does not interfere in any way with the operation of the reciprocating tool carrying slide which will be described in detail hereinafter. As illustrated, there is provided a horizontal supporting bar 27 which is parallel with the bed 1. Preferably, this bar is supported at both ends, the support at the headstock end being in the form of a casting 28 which is secured to the headstock casting 4 by suitable means such as the bolts 29, 29. The casting 28 is provided with a cap plate 30 held in place by screws $30^a$. At the other end the bar 27 is supported by a bracket 31 which rests upon and is secured to the rear part of the bed 1. The bracket 31 is provided with a cap plate 32 suitably held in place by screws similar to the screws $30^a$. Preferably the bracket 31 engages the usual ways with which the bed is provided, and is adjustable along these ways so as to provide a support for the bar 27 as close to the support 28 as the circumstances at any given time permit. A bolt 33 together with a cross bar $33^a$ provide convenient means for clamping the bracket 31 in its adjusted position. Preferably the bar 27 is detachably engaged with its supports, being normally held against movement by set screws 34, 34 and 35, 35.

The bar 27 is preferably hollow and polygonal in form, being shown as triangular. The triangular form is particularly advantageous as it permits the supports for the bracket to be provided with V-shaped openings into which the bar fits without any possibility of looseness. The pressure applied to the top of the bar by means of the said set screws 34, 34 and 35, 35, forces the sides of the bar into firm engagement with the walls of the openings in the supports. Preferably the central portions of all three sides of the bar are depressed so as to provide bearing surfaces only near the corners thereof. Another advantage of the triangular construction is that it provides a minimum interference with light.

The tailstock comprises a main frame in the form of two castings 36 and 37 formed to fit together and closely engage the surfaces of the bar 27. These castings are suitably connected at the top by screws 38, 38 and at the bottom by screws or bolts 39, 39. There is also provided a bolt 40 by means of which the two sections can be clamped firmly against the surfaces of the bar. The lower parts of the castings 36 and 37 are recessed to receive a longitudinally slidable sleeve 41 in which is mounted a center 42. The sleeve 41 can be moved longitudinally by means of the screw 43 controlled by the hand wheel 44. By means of the clamp 45 controlled by the screw 46 and handle 47, the sleeve 41 can be clamped in adjusted position.

It will be seen that by suitably positioning the tailstock on the bar 27 and by then adjusting the center 42 by means of the sleeve 41 and the hand wheel 44, a cutter or other article to be relieved can be secured in the usual way between the two centers 8 and 42; and the cutter can be connected to the face plate on the live spindle in any usual or preferred way to be rotated.

As already stated, it may in some cases be preferable to mount the cutter entirely on the live spindle, and for this purpose a collet mechanism such as shown in Fig. 6 may be provided. The spindle 7 is hollow and rotatably mounted therein is a sleeve or bushing 48 controlled by a hand wheel 49. The sleeve 48 has threaded engagement with a collet 50. By turning the hand wheel and the sleeve in one direction or the other the collet can be drawn inward and closed or moved outward and permitted to open. The shank of a cutter to be relieved can be inserted in the collet and the cutter can thus be held and rotated independently of the tailstock. A rod 51 adjustably mounted in the sleeve 48 serves as an abutment to limit the inward movement of the cutter shank. It will be understood that when a center is used as shown in Figs. 1 and 4 it can be held by a collect mechanism such as that described.

When the cutter is supported entirely on the live spindle it may be desirable for the sake of convenience to entirely remove the tailstock and its supporting means. This can be easily done by loosening the bolt 33 and the bolts 29, thus making it possible to detach as a unit the tailstock, the supporting bar and the two castings in which the bar is mounted.

The cutting tool must be so held and supported that it can be moved toward and from the cutter to be relieved in timed relation to the rotation thereof. The tool must make as many movements forward and backward during each rotation as the cutter has teeth. A cutting tool is indicated at 52, and for supporting it there is provided a reciprocable horizontal slide 53 to which the tool is secured in any suitable way. A supporting device 54 is provided for the slide 53 and preferably this supporting device is provided with separated parallel ways with which the slide engages. When it is desired to make it possible for the cutting tool to approach the cutter from any angle, the supporting device 54 must be in the form of a turntable rotatable about a vertical axis, and in the drawings the supporting device 54 is so shown. The turntable 54 rests upon a saddle 55 which is supported on the bed of the machine. The turntable is provided with annular bearing surfaces which fit similar bearing surfaces formed on the saddle, and the saddle is also provided with an annular T-slot 56 into which extend T-bolts 57 adapted to lock the turntable in any desired angular position. Preferably the saddle 55 is slidable along the bed 1, the bed being provided with the usual ways on which the saddle rests. By means of suitable bolts 58 the saddle can be clamped in any desired position. Pivoted at 59 on the supporting device or turntable 54 is a lever 60 having two arms, one of which has connection with the slide 53 and the other of which is engaged by a suitable cam 61. When the supporting device 54 is in the form of a turntable, as here shown, the cam 61 is positioned with its power receiving axis coincident with the axis of the turntable, thus making it possible for the cam and lever to properly coöperate with the turntable in any position of adjustment. As illustrated the axis of rotation of the cam coincides with the axis of the turntable, but this exact construction is not essential. Preferably the cam is in the form of a groove in the top of a wheel 62. The wheel 62 is mounted on a conical stud 63 secured to a depressed part of the saddle 55. The wheel 62 is preferably provided with worm teeth 64 which mesh with a worm 65 on a shaft 66. When the saddle 55 is adapted for longitudinal movement along the bed, the shaft 66 is longitudinally arranged and the worm 65 is splined to it. It will be clear that when the shaft 66 is rotated motion will be transmitted through the worm and worm wheel to rotate the cam.

One arm of the lever 60 is provided with a roller 67 which extends into the cam groove 61. The groove is preferably of the form shown in Fig. 2, being adapted to move the lever slowly in one direction and rapidly in the other. Connected with the slide 53 for normal movement in unison therewith, is a device 68 which power is applied by the lever for actuating the slide. The lever 60 is adjustable so as to vary the amount of movement which it transmits to the device 68 and to the tool-carrying slide 53. Preferably this adjustment is effected by changing the effective length of one arm of the lever and as shown, this arm of the lever is constructed with two telescopically engaging parts. At the sides of the body part of the lever are two slidable plates 69, 69 formed with oppositely disposed thickened portions 70, 70 each with a surface in the form of a section of a cylinder, these two cylindrical surfaces having a common center. The surfaces of the enlargements 70, 70 fit between transverse parallel surfaces 71, 71 provided on the actuating device 68, and as the surfaces on the parts 70, 70 are cylindrical, the engagement with the surfaces 71, 71 is maintained notwithstanding any angular movement. The two plates 69, 69 are secured to a block 72 which is centrally recessed to receive an extension 73 on the body part of the lever. An adjusting screw 74 extends through an aperture in the block and is held against longitudinal movement with respect thereto. The inner end of the screw extends into a threaded aperture in the said extension 73. The outer end of the screw is squared to receive a wrench, and by turning the screw the block 72 together with the plates 69, 69 can be moved so as to bring the center of the cylindrical surfaces 70, 70 toward or away from the pivotal center of the lever. Preferably at the extreme inner position the center of the cylindrical surfaces coincides with the pivotal center, and no movement of the actuating device or the slide takes place as the lever is oscillated. As the screw is turned to move the center of the cylindrical surfaces outward, the movement of the actuating device and slide is gradually started and this movement is increased as the effective length of the lever is increased. In this way the extent of movement of the tool slide can be varied from zero to maximum. The screw 74 can be clamped by means of the screw 75.

As already stated, the cam 61 is in the form of a groove, thus making it possible for the cam to positively move the lever in each direction, the construction being distinguished in this respect from other constructions in which the cam is effective in one direction only, reliance being placed upon a spring for effecting movement in the other direction. While, as stated, the cam acts positively in both directions, I nevertheless prefer to provide a spring for assisting the cam in effecting the short rapid return movement of the slide. By means of the spring I avoid excessive strain on the lever, the cam, and the several power transmitting parts. As illustrated, the turntable 54 is provided with an aperture 76 parallel with the line of movement of the actuating device and slide, and a spring 78 is provided which abuts at one end against the actuating device 68 and at the other end against a plug 79 threaded into the aperture 76. For holding the spring 78 in place there are provided pins 77 and 77ª secured respectively to the actuating device 68 and to the plug 79.

I have shown the two arms of the lever 60 as extending at right angles to each other as this construction is preferable for a machine of the type here illustrated. It will be understood, however, that under some circumstances, this right-angled construction need not be used.

As already stated, the cam wheel 62 is rotated by means of the shaft 66 and the worm 65. For rotating the shaft 66 I preferably provide the following mechanism. A transverse shaft 80 is mounted in suitable bearings in the bed, and this shaft carries a bevel gear 81 which meshes with a bevel gear 82 on the shaft 66. Power to rotate the shaft 80 is transmitted from the aforesaid drive shaft 12 by means of a series of gears, these gears being interchangeable so as to provide for the driving of the shaft 80 at different speeds. As shown, the shaft 12 is provided at its forward end with a pinion 83 which meshes with a gear 84 carried by a shaft 85 mounted in the headstock casting. Rigidly connected with the gear 84 is a pinion 86 which meshes with an idler gear 87 mounted on a stud 88 which is slidable in a bracket 89 secured to the bed. This gear 87 meshes with a second idler gear 90 which is mounted on a stud secured to a bracket 91 mounted for swinging movement on the shaft 80. This bracket can be locked by means of a bolt 92. The gear 90 meshes with a gear 93 on the shaft 80. It will be seen that when the shaft 12 is rotated the shaft 80 will also be rotated but at a greatly reduced speed. If a different speed is required for the shaft 80, this can be obtained by removing the gears 83, 84 and 86 and substituting gears of different diameters. It will be noted that the idler gears 87 and 90 are adjustable so that proper meshing with the differently diametered gears is effected.

As has already been stated, it is necessary for the cutting tool to make one forward and backward movement for each tooth of the cutter to be relieved. It is therefore necessary that for each revolution of the live spindle the cam 61 be given as many rotations as the cutter has teeth. By using gears of the proper sizes the number of rotations of the cam for each rotation of the live spindle can be varied, and a further variation can be obtained by connecting one or the other of the worm wheels 10 or 11 with the live spindle, thus varying the speed of the spindle with respect to the speed of the drive shaft 12. By means of this two-speed worm and wheel drive mechanism for the spindle, I am enabled to greatly increase the range of the machine without providing an unduly large number of interchangeable gears.

As already stated, the carriage is preferably movable longitudinally of the bed and this movement can be effected either manually or by power. For the purpose of moving the carriage manually there is provided a rack 94 secured to the bed. Connected with the saddle 55 is the apron 95 on which is mounted a short transverse shaft carrying a pinion 96 meshing with the rack. By means of a hand wheel 97 the pinion can be turned to move the carriage.

Mounted in suitable bearings at the rear of the machine is a lead screw 98 adapted to be connected with the live spindle by means of suitable gearing. This gearing of itself constitutes no part of my present invention and can be of any usual or preferred form. As shown, it comprises a gear 99 secured to the spindle 7 and adapted to mesh either with a gear 100 or an idler pinion 101. The gear 100 and the idler pinion 101 are mounted on a swinging bracket 102 adapted to be controlled by the link 103 and the hand lever 104. By means of this lever the bracket 102 can be moved either to bring the gear 100 into mesh with the gear 99 as shown in Fig. 3 or to bring the idler pinion 101 into mesh with the gear, or to bring both the gear and the pinion out of mesh. From the gear 100 power is transmitted to the lead screw through the gears 105, 106, 107 and 108, some of which are interchangeable in the usual way to vary the rate of rotation of the lead screw with respect to that of the spindle. It will be seen that the lead screw can be entirely disconnected from the spindle or can be connected therewith for rotation in either direction. 109 is a nut on the lead screw which is connectible with the carriage by means of the screw 110. When the screw is not in use the nut will ordinarily be disconnected from the carriage so as to permit the movement of the carriage manually.

As already stated, the cutting tool 52 can be mounted on the slide 53 in any suitable manner. However, when the slide is mounted as herein shown and described, I prefer a tool holding and supporting means which comprises a plate 111 adjustable angularly with respect to the slide and also longitudinally of the slide. The plate 111 is connected with a plate 112 having an annular beveled surface. A ring 113 having a similar beveled surface surrounds the plate 112 and is adjustably secured to the slide by means of bolts 114 engaging T-slots 115. This construction permits the plate 111 to be moved longitudinally of the slide or angularly, and when the bolts 114 are tightened the plate is locked in place. Mounted on the plate 111 is a slide 116 horizontally movable under the control of a screw 117. Mounted on the slide is a clamp 118 in which may be held the tool 52.

Means are provided whereby the extent of the forward movements of the cutting tool may be increased as the tool rotates, thus effecting feeding and causing the tool to take a fresh chip at each rotation of the cutter. I prefer to effect the feeding automatically and preferably the construction is such that the feeding takes place intermittently at the end of each rotation of the cutter instead of gradually.

The actuating device 68 has been described as normally movable in unison with the tool carrying slide 53. The two elements are connected by a rotatable screw 118 which has threaded engagement with the slide. The inner end of the screw extends through an aperture in the actuating device and is held against longitudinal movement with respect to the said device by means of lock nuts at 119. Mounted in the device which supports the slide 53 (in this case the turntable 54) is a short rotatable shaft 120 provided at its inner end with a clutch element 121 which is shaped to engage the end of the clutch element 122 on the screw 118 and impart rotary movement thereto. It will be understood that the clutch elements permit relative longitudinal movement, thus permitting the actuating device and the slide to reciprocate without, however, causing any reciprocation of the screw actuating shaft 120.

Feeding is effected by turning the shaft 120, and this is preferably accomplished automatically. Loosely mounted on the shaft is a worm wheel 123 with which meshes a worm 124. Splined to the shaft 120 is a disk 125 and interposed between the disk and the worm wheel is a friction washer. Springs are provided for causing frictional engagement at the washer, thus providing a frictional connection between the worm wheel and the shaft.

The devices for rotating the worm 124 may vary with the type of machine, but in a machine of the sort illustrated, in which the slide 53 is mounted on a turntable, the following elements are preferably provided for operating the worm. As shown in Fig. 8, the worm 124 is secured to a horizontal shaft 126 mounted in suitable bearings in the turntable 54. At one end of the shaft 126 is a bevel gear 127 meshing with a bevel pinion 128 secured to a vertical bushing 129. This bushing carries at its lower end a toothed clutch element 130 upon which is rotatably mounted a gear 131. Slidably and rotatably mounted in the bushing 129 is a shaft 132 to the lower end of which is secured a ratchet wheel 133 having on its upper surface teeth adapted to mesh with the teeth of the clutch element 130. At the upper end of the shaft 132 is a grooved collar 134 into the groove of which fit projections on the forked arm of a bell-crank 135. By moving the bell-crank the shaft 132 can be raised or lowered to bring the clutch teeth on the ratchet wheel 133 into or out of engagement with the teeth on the clutch element 130. Mounted on the gear 131 is a ratchet or pawl 136 spring pressed into engagement with the teeth of the ratchet wheel 133. By means of this pawl the ratchet wheel is rotated in the clockwise direction whenever the gear is rotated in the said direction, and this motion is transmitted to the sleeve 129 and the parts connected therewith whenever the ratchet wheel is in its upper position to engage the clutch teeth.

Mounted on the turntable 54 for movement about the axis thereof, is a suitable power transmitting element, and by preference this element is in the form of an annular toothed ring 137. As shown, the ring 137 is mounted in an annular rabbet formed at the periphery of the turntable, the bottom of the ring engaging the top surface of the saddle 55. The ring is provided with teeth on its outer periphery, and the construction of the turntable is such that these teeth are exposed throughout the major portion of the periphery. Means are provided for imparting movement to the ring 137, and this movement is transmitted to the gear wheel 131 by means of idler gears 138 and 139 mounted on the turntable. Inasmuch as the ring is concentrically mounted, the power connection with the said gear 131 is maintained for all positions of the turntable. For imparting movement to the ring 137 there is preferably provided a gear wheel 140 meshing with the teeth of the ring. This gear wheel is secured to a vertical shaft 141 mounted in the saddle 55, and at the lower end of the shaft is a bevel pinion 142 meshing with a bevel gear 143 mounted on a longitudinal shaft 144. When the saddle is longitudinally movable as herein shown and described, the gear 143 is splined to its shaft to permit longitudinal movement thereon.

The shaft 144 is mounted in suitable bearings in the bed and is provided at one end with means for imparting movement thereto. Preferably the shaft is given an oscillatory movement and the means for imparting such movement as shown, comprises a pinion 145 meshing with a rack 146 secured to or formed on a link 147. Loosely mounted on the shaft 145 is a housing 148 which serves as a guide for the rack, holding it in mesh with the pinion. Pivotally mounted on the head-stock casting is a bell-crank 149, one arm of which is provided with a T-slot. A T-bolt 150 fits in the T-slot and serves as a pivot for the upper end of the rod 147. This pivot is adjustable along the arm and the amount of travel of the link as the bell-crank is oscillated can be varied from zero to maximum. Mounted on the live spindle 7 is a disk 151 provided with a cam groove 152. A roller on the bell-crank 149 fits this groove and the groove is so shaped that in at least one direction the bell-crank is given a rapid movement.

From the foregoing description it will be seen that as the live spindle is rotated the cam 152 imparts a rocking movement to the bell-crank 149, which serves to reciprocate to a greater or less extent the link 147 and the rack 146. By means of the rack, oscillatory movement is transmitted to the shaft 144 and through the connections described, this movement is transmitted to the gear 131. By means of the pawl 136 the movement of the gear 131 in one direction is transmitted to the ratchet wheel 133, the pawl passing freely over the teeth of the ratchet wheel when the gear 131 moves in the other direction. When the ratchet wheel is connected with the sleeve 129 the intermittent movement thereof is transmitted to the worm wheel 123 from which, by means of the friction devices described, it is transmitted to the shaft 120 and the feed screw 118. As the movement in one direction occurs once for each revolution of the spindle and of the cutter driven thereby, the feed is effected once for each revolution of the cutter. The amount of feed at each revolution can be varied by adjusting the pivot at 150.

In addition to the automatic feeding means, I preferably also provide hand operated means for controlling the tool. As illustrated, this hand controlled means comprises a hand wheel 153 mounted on a short shaft 154 on which is mounted a spiral gear 155 meshing with a spiral gear 156 on the shaft 126. Frequently in order to start the cutting it is desirable to advance the tool in the feeding direction at a speed greater than that caused by the automatic mechanism. This can be done at any time by means of the hand wheel without interfering in any way with the operative relation of the automatic mechanism. The ratchet wheel is advanced with respect to its driving pawl, the teeth of the wheel freely slipping under the pawl. Whenever the more rapid manual movement is discontinued, the movement by means of the pawl is resumed as before. In case it is desired to move the tool backward the ratchet wheel is disconnected by means of the bell-crank 135, thus placing the tool entirely under the control of the hand wheel.

For automatic feeding it is preferable to provide means whereby the feeding is automatically stopped at a predetermined limit. I provide a limiting or stopping device which comprises a button 157 on a T-bolt situated in a T-slot 158 in the disk 125. Cooperating with the button 157 is a movable stop 159 which in operative position is adapted to be engaged by the button as the disk 125 rotates. By suitably adjusting the button with respect to the disk the button can be made to engage the stop after feeding has taken place to the desired extent. It will be seen that as soon as the button does engage the stop, further movement of the shaft 120 and of the feed screw is prevented, the friction elements permitting the worm to continue to turn as before.

When the tool is to be controlled manually, it is desirable to prevent the engagement of the button 157 and the stop 159, and I therefore provide means whereby the stop 159 can be withdrawn. Preferably the stop is withdrawn simultaneously with the disconnection of the ratchet wheel 133. In order that this may be done I provide a short rock shaft 160 on which is mounted a handle 161. The shaft 160 is provided with a cam 162 which engages the lower forked end of the bell-crank 135. The shaft 160 is also provided with a cam 163 which is adapted to engage the end of the stop 159 to hold it in operative position, the cam opposing a spring tending to move the stop out of operative position. The two cams 162 and 163 are secured to the shaft in such relation to each other that when the handle 161 is moved in one direction the stop 159 is moved into operative position and the ratchet wheel 131 is connected with the clutch element 130. When the handle 161 is moved in the other direction the stop 159 is permitted to be withdrawn and the ratchet wheel is disconnected, thus leaving the tool controlling mechanism entirely free for manual operation.

In addition to forming part of the automatic stop mechanism the friction elements described also serve to prevent injury to the machine in case the normal feeding operation is interfered with in any way. In the case of any abnormal resistance to feeding, the friction elements will slip and no harm will result.

In operation, the operator first observes the number of teeth on the cutter to be relieved and then by placing the lever 25 into proper position and by making use of the proper gears 83, 84 and 86 he provides for the movement of the tool slide as many times per revolution of the spindle as the cutter has teeth. It will be understood that the provision of the two differently speeded connections from the drive shaft to the spindle makes it possible for the same set of change gears 83, 84 and 86 to be used for cutters with two different numbers of teeth. This construction therefore makes it possible to use the machine for the required range of tooth numbers with a much smaller number of change gears than would otherwise be necessary. By adjusting the lever 60 by means of the screw 74 the amount of movement of the slide is regulated in accordance with the amount of relief desired on each tooth of the cutter. By adjusting the pivot bolt 150 in its slot the rate of feed is regulated as required. The cutter to be relieved is put in place and secured in the usual way, and if necessary the turntable is moved so as to bring the line of movement of the tool slide at right angles to the faces of the cutting teeth. It will be understood that the turntable is movable through an angle of 180° or more so that cutters of any sort can be relieved. One of the possible positions of the turntable is indicated by dotted lines in Fig. 2. The mounting of the tailstock on an overhead support permits the turntable and the tool slide and the parts carried thereby, to move freely under it without interference of any sort. When the parts have been properly adjusted as outlined above, the tool is brought into working relation with the cutter, being advanced manually if necessary. The limit button 157 is so adjusted as to stop the feed after a sufficient cut has been taken.

If the cutter to be relieved is a tap, or other tool having teeth conforming to a thread, the lead screw 98 is connected to move the carriage longitudinally at the proper rate to permit the cutting tool to follow the threads of the tap. If the cutter is a reamer or other similar tool having a cutting face longer than the width of the relieving tool, the feed screw can be used to feed the carriage longitudinally so that the cutting tool will traverse the entire length of the cutter. It will be understood that ordinarily when the lead screw is in use the automatic feed will be disconnected.

It will be seen that the action of the machine is entirely automatic after the preliminary adjustments have been made and after the cutter has been put in place, and no harm can result even if the machine does not receive the undivided attention of the operator as the feeding is automatically stopped at the proper time, thus preventing any injury to the cutter.

In Figs. 9 and 10 I have shown an alternate form of feed mechanism which can be substituted for the feed mechanism already described. This mechanism is particularly adapted for use when it is permissible to effect the feeding gradually instead of intermittently at each revolution.

In Figs. 9 and 10 the shaft 126 is extended and a ratchet wheel 133ᵃ is loosely mounted thereon. Splined to the shaft is a clutch element 130ᵃ controlled by a lever 135ᵃ, this lever being similar in function to the bell-crank 135 already described, being similarly actuated by the shaft 160 and the cam 162ᵃ. The clutch element 130ᵃ is provided with teeth adapted to engage similar teeth on the hub of the ratchet wheel 133ᵃ. The cam 162ᵃ is so positioned on the shaft 160 that when the stop 159 is in operative position as shown, the clutch element 130ᵃ is held in engagement with the clutch teeth on the ratchet wheel. When the hand lever 161 is moved to permit the withdrawal of the stop the clutch element is moved to disengage the ratchet wheel.

Mounted on the turntable for movement about the axis of the shaft 126 is a lever 164, this lever carrying a pawl 136[a] which normally engages the teeth of the ratchet wheel 133[a]. For actuating the lever 164 to move the pawl in the operative direction, there is provided a rod 165 slidably mounted in suitable brackets or lugs 166 on the turntable. One end of the rod engages the lever 164 and the other end of the rod is positioned to be engaged by the block 72 forming a part of the lever 60. A spring 167 engages the lever 164, thus tending to move the lever and the rod 165 toward the lever 60.

As the lever 60 with the block 72 is oscillated the rod 165 is reciprocated, this causing oscillation of the lever 164. By means of the pawl 136[a] the ratchet wheel 133[a] is rotated and feeding is effected in the way already described. Mounted on the rod 165 is a stop 168 adjustably held in position by means of a set screw. By means of the stop the movement of the rod toward the right as viewed in Fig. 9 can be limited, and in this way the extent of reciprocation can be varied and the rate of feed varied.

It will be understood that with the mechanism last described the feeding is effected at a substantially uniform rate, the cutting tool being advanced slightly at each successive tooth of the cutter. In practice the thickness of the chip will be successively increased at each tooth until one complete revolution of the cutter has been made, and the feed must be so adjusted as to provide the desired maximum thickness of chip at the end of one revolution.

After the first revolution chips of uniform thickness are removed from the successive teeth until the feeding is stopped, and then the cutter must be rotated for at least one additional rotation in order to true the teeth and bring their cutting edges at uniform distance from the axis.

It will be understood that when the feeding mechanism shown in Figs. 9 and 10 is used, the major portion of the feeding mechanism shown in the other figures is omitted. In other words, it is possible to omit the driving cam 151 and all of the parts driven thereby up to the shaft 126 which is driven by the ratchet wheel 133[a] as already described.

What I claim is:

1. In a relieving lathe, the combination of means for holding and rotating a cutter, a tool holder, means comprising a single-throw cam acting positively to advance the tool holder slowly toward the cutter and acting positively to withdraw it rapidly therefrom a plurality of times during each rotation of the cutter, and means for varying from zero to maximum the extent of advance and withdrawal.

2. In a relieving lathe, the combination of means for holding and rotating a cutter, a tool holder, means comprising a cam acting positively to advance the tool holder slowly toward the cutter and acting positively to withdraw it rapidly therefrom in timed relation to the rotation thereof, and a spring coöperating with the cam to assist in moving the tool holder away from the cutter.

3. In a relieving lathe, the combination of means for holding and rotating a cutter, a tool holder, means for positively moving the tool holder toward and away from the cutter in timed relation to the rotation thereof, the said means comprising an oscillating lever having two telescopically engaging parts, and means for moving one of the lever parts relatively to the other to change the effective length of the lever thereby varying the extent of movement of the tool holder.

4. In a relieving lathe, the combination of means for holding and rotating a cutter, a tool holding device provided with a slot having parallel walls, means for moving the tool holding device toward and away from the cutter in timed relation to the rotation thereof, the said means comprising an oscillating lever having two telescopically engaging parts one of which has a cylindrical surface fitting between and engaging the parallel slot walls, and means for moving the last said lever part relatively to the other to change the effective length of the lever thereby varying the extent of movement of the tool holding device.

5. In a relieving lathe, the combination of means for holding and rotating a cutter, a tool holding device provided with a slot having parallel walls, means for moving the tool holding device toward and away from the cutter in timed relation to the rotation thereof, the said means comprising an oscillating lever having two telescopically engaging parts one of which has a cylindrical surface fitting between and engaging the parallel slot walls, and means for moving the last said lever part relatively to the other to bring the axis of the cylindrical surface into or out of coincidence with the pivotal axis of the lever.

6. In a relieving lathe, the combination of means for holding and rotating a cutter, a tool holding means comprising a horizontal turntable and a horizontal slide on the turntable, a cam mounted coaxially with the turntable and rotatable in timed relation with the rotation of the cutter, and cam actuated means operable for all positions of the turntable for moving the slide toward and away from the cutter, the said means being constructed to act positively in each direction.

7. In a relieving lathe, the combination of means for holding and rotating a cutter, a tool holding means, comprising a horizontal turntable and a horizontal slide on the turntable, a cam mounted coaxially with the turntable and rotatable in timed relation with the rotation of the cutter, cam actuated means operable for all positions of the turntable for moving the slide toward and away from the cutter, and means for varying the extent of slide movement.

8. In a relieving lathe, the combination of means for holding and rotating a cutter, a tool holding means comprising a horizontal turntable and a horizontal slide on the turntable, a cam mounted co-axially with the turntable and rotatable in timed relation with the rotation of the cutter, cam actuated means operable for all positions of the turntable for moving the slide toward and away from the cutter, and means operable while the slide is in motion for adjusting the moving means and automatically locking it in adjusted position thereby varying the extent of slide movement.

9. In a relieving lathe, the combination of means for holding and rotating a cutter, a tool holding means comprising a horizontal turntable and a horizontal slide on the turntable, angularly movable means positioned in bodily fixed relation to the turntable and rotatable in timed relation with the rotation of the cutter, and a device bodily movable with the turntable and actuated by the said angularly movable means for moving the slide toward and away from the cutter, the said device being adjustable to change the amount of movement of the slide.

10. In a relieving lathe, the combination of means for holding and rotating a cutter, a tool holding means comprising a horizontal turntable and a horizontal slide on the turntable, angularly movable means positioned in bodily fixed relation to the turntable and rotatable in timed relation with the rotation of the cutter, and a device bodily movable with the turntable and actuated by the said angularly movable means for moving the slide toward and away from the cutter, the said device being adjustable to change the amount of movement of the slide from zero to maximum.

11. In a relieving lathe, the combination of means for holding and rotating a cutter, a tool holding means comprising a horizontal turntable and a horizontal slide on the turntable, means angularly movable concentrically with the axis of the turntable in timed relation with the rotation of the cutter, and a device bodily movable with the turntable and actuated by the said angularly movable means for moving the slide toward and away from the cutter, the said device being adjustable to change the amount of movement of the slide.

12. In a relieving lathe, the combination of means for holding and rotating a cutter, a tool holding means comprising a horizontal turntable and a horizontal slide on the turntable, a cam mounted coaxially with the turntable and rotatable in timed relation with the rotation of the cutter, and means for moving the slide toward and away from the cutter comprising a cam actuated lever pivoted on the turntable.

13. In a relieving lathe, the combination of means for holding and rotating a cutter, a tool holding means comprising a horizontal turntable and a horizontal slide on the turntable, a cam mounted coaxially with the turntable and rotatable in timed relation with the rotation of the cutter, and means for moving the slide toward and away from the cutter comprising a cam actuated bell-crank lever operable for all positions of the turntable.

14. In a relieving lathe, the combination of means for holding and rotating a cutter, a tool holding means comprising a horizontal turntable and a horizontal slide on the turntable, a cam mounted coaxially with the turntable and rotatable in timed relation with the rotation of the cutter, a cam actuated lever for moving the slide toward and away from the cutter, and means for adjusting the lever to vary the extent of slide movement.

15. In a relieving lathe, the combination of means for holding and rotating a cutter, a tool holding means comprising a horizontal turntable and a horizontal slide on the turntable, a cam mounted coaxially with the turntable and rotatable in timed relation with the rotation of the cutter, a cam actuated lever for moving the slide toward and away from the cutter, and means for changing the effective length of the lever and thereby varying the extent of slide movement.

16. In a relieving lathe, the combination of means for holding and rotating a cutter, a tool holding means comprising a horizontal turntable and a horizontal slide on the turntable provided with a slot having parallel walls, a lever having two telescopically engaging parts one of which has a cylindrical surface fitting between and engaging the parallel slot walls, means for moving the last said lever part relatively to the other to bring the center of the cylindrical surface into or out of coincidence with the pivotal axis of the lever, and means for oscillating the lever in timed relation with the rotation of the cutter.

17. In a relieving lathe, the combination of means for holding and rotating a cutter, a tool holding means comprising a horizontal turntable and a horizontal slide on the turntable, and means operable for all positions of the turntable for moving the slide toward and from the cutter in timed relation to the rotation thereof, the said means comprising an integrally formed worm wheel and cam mounted coaxially with the turntable and a worm engaging the worm wheel.

18. In a relieving lathe, the combination of means for holding and rotating a cutter, a tool holding means comprising a horizontal turntable and a horizontal slide on the turntable, a rotatable cam, a conical bearing stud for the cam rigidly mounted coaxially with the turntable, and cam actuated means operable for all positions of the turntable for moving the slide toward and away from the cutter in timed relation to the rotation thereof.

19. In a relieving lathe, the combination of means for holding and rotating a cutter, a longitudinally movable tool carriage comprising a horizontal turntable and a horizontal slide on the turntable, and means operable for all positions of the turntable for moving the slide toward and away from the cutter in timed relation to the rotation thereof, the said means comprising a unitary worm wheel and cam mounted coaxially with the turntable, a worm engaging the worm wheel and a longitudinal shaft upon which the worm is splined.

20. In a relieving lathe, the combination of means for holding and rotating a cutter, a tool holder, means for moving the tool holder toward and away from the cutter in timed relation to the rotation thereof, a device for giving the tool holder a feeding movement supplemental to the aforesaid normal movements, automatic means for operating the feeding device, and means for preventing the operation of the feeding device by the said automatic means after feeding has taken place to a predetermined extent.

21. In a relieving lathe, the combination of means for holding and rotating a cutter, a tool holder, means for moving the tool holder toward and away from the cutter in timed relation to the rotation thereof, a device for giving the tool holder a feeding movement supplemental to the aforesaid normal movements, automatic frictionally acting means for operating the feeding device, and means for limiting the extent of movement of the feeding device.

22. In a relieving lathe, the combination of means for holding and rotating a cutter, a tool holder, means for moving the tool holder toward and away from the cutter in timed relation to the rotation thereof, a device for giving the tool holder a feeding movement supplemental to the aforesaid normal movements, automatic frictionally acting means for operating the feeding device, and an adjustable device for stopping the feeding device after movement to a predetermined extent.

23. In a relieving lathe, the combination of means for holding and rotating a cutter, a tool holder, means for moving the tool holder toward and away from the cutter in timed relation to the rotation thereof, a device for giving the tool holder a feeding movement supplemental to the aforesaid normal movements, automatic frictionally acting means for operating the feeding device, a device for stopping the feeding device after movement to a predetermined extent, and means for rendering the said stopping device inoperative whereby the feeding device may be moved indefinitely in either direction.

24. In a relieving lathe, the combination of means for holding and rotating a cutter, a tool holder, means for moving the tool holder toward and away from the cutter in timed relation to the rotation thereof, a device for giving the tool holder a feeding movement supplemental to the aforesaid normal movements, automatic frictionally acting means for operating the feeding device, a device for stopping the feeding device after movement to a predetermined extent, a device for stopping the operation of the automatic operating means, and a device for rendering the said stopping device inoperative, whereby the feeding device may be manually moved indefinitely in either direction.

25. In a relieving lathe, the combination of means for holding and rotating a cutter, a tool holder, means for moving the tool holder toward and away from the cutter in timed relation to the rotation thereof, a device for giving the tool holder a feeding movement supplemental to the normal movements, automatic frictionally acting means for operating the feeding device, a device for stopping the feeding device after movement to a predetermined extent, and means for simultaneously stopping the operation of the automatic operating means and rendering the said stopping device inoperative whereby the feeding device may be manually moved indefinitely in either direction.

26. In a relieving lathe, the combination of means for holding and rotating a cutter, a tool holder, means for moving the tool holder toward and away from the cutter in timed relation to the rotation thereof, a device for giving the tool holder a feeding movement supplemental to the aforesaid normal movements, automatic means for operating the feeding device, and a manually controllable positive clutch interposed between the automatic operating means and the feeding device.

27. In a relieving lathe, the combination of means for holding and rotating a cutter, a horizontal tool carrying slide, a turntable supporting the slide, a slide actuating device normally movable therewith, means engaging the slide and the actuating device for relatively adjusting them, a reciprocating means engaging the actuating device and operable for all positions of the turntable, and automatic means connected with the adjusting means for operating it irrespectively of the position of the turntable.

28. In a relieving lathe, the combination of means for holding and rotating a cutter, a horizontal tool carrying slide, a turntable supporting the slide and movable through an angle of at least 90°, a slide actuating device normally movable therewith, means engaging the slide and the actuating device for relatively adjusting them, a reciprocating means engaging the actuating device and operable for all positions of the turntable, and automatic means connected with the adjusting means for operating it irrespectively of the position of the turntable.

29. In a relieving lathe, the combination of means for holding and rotating a cutter, a horizontal tool carrying slide, a turntable having separated ways supporting the slide, a slide actuating device mounted independently of the turntable in ways formed on the bottom of the slide, means engaging the slide and the actuating device for relatively adjusting them, and a reciprocating means operable for all positions of the turntable and comprising an element positioned beneath the actuating device and directly engaging therewith.

30. In a relieving lathe, the combination of means for holding and rotating a cutter, a horizontal tool carrying slide, a horizontal turntable supporting the slide, a slide actuating device normally movable therewith, means engaging the slide and the actuating device for relatively adjusting them, a reciprocating means engaging the actuating device and operable for all positions of the turntable, and means fixed against bodily movement with the slide for operating the adjusting means while the slide and actuating device are in motion.

31. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, and automatic means for causing the forward limit of the movements toward the cutter to be advanced.

32. In a relieving lathe, the combination of means for holding and rotating a cutter, a horizontal turntable movable through an angle of at least 90°, a horizontal tool carrying slide on the turntable, means operable for all positions of the turntable for moving the slide toward and away from the cutter in timed relation to the rotation thereof, and automatic means for causing the forward limit of the movements toward the cutter to be advanced.

33. In a relieving lathe, the combination of means for holding and rotating a cutter, a horizontal turntable movable through an angle of approximately 180°, a horizontal tool carrying slide on the turntable, means operable for all positions of the turntable for moving the slide toward and away from the cutter in timed relation to the rotation thereof, and automatic means for causing the forward limit of the movements toward the cutter to be advanced.

34. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, and automatic means for causing the forward limit of the movements toward the cutter to be intermittently advanced.

35. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, automatic means for causing the forward limit of the movements toward the cutter to be advanced, and means for varying the rate of advance of the said limit of forward movements.

36. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, and automatic feeding means for the slide supplemental to the said moving means.

37. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, automatic feeding means for causing the forward limit of the movements toward the cutter to be advanced, and means for preventing the operation of the feeding means after feeding has taken place to a predetermined extent.

38. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, automatic feeding means carried by the turntable for causing the forward limit of the movements toward the cutter to be advanced, and means carried by the turntable for preventing the operation of the feeding means after feeding has taken place to a predetermined extent.

39. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, and automatic frictionally acting feeding means for causing the forward limit of the movements toward the cutter to be advanced.

40. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, and automatic frictionally acting feeding means carried by the table for causing the forward limit of the movements toward the cutter to be advanced.

41. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, automatic frictionally acting feeding means for causing the forward limit of the movements toward the cutter to be advanced, and means for preventing the operation of the feeding means after feeding has taken place to a predetermined extent.

42. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, a device for giving the tool holder a feeding movement supplemental to the aforesaid normal movements, automatic frictionally acting means for operating the feeding device, a device for stopping the feeding device after movement to a predetermined extent, and means for rendering the said stopping device inoperative whereby the feeding device may be moved indefinitely in either direction, the said feeding device and the several parts associated there with being all carried by the turntable.

43. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation there of, a device for giving the tool holder a feeding movement supplemental to the aforesaid normal movements, automatic frictionally acting means for operating the feeding device, a device for stopping the feeding device after movement to a predetermined extent, a device for stopping the operation of the automatic operating means, and a device for rendering the said stopping device inoperative, whereby the feeding device may be manually moved indefinitely in either direction, the said feeding device and the several parts associated therewith being all carried by the turntable.

44. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, a device for giving the tool holder a feeding movement supplemental to the normal movements, automatic frictionally acting means for operating the feeding device, a device for stopping the feeding device after movement to a predetermined extent, and means for simultaneously stopping the operation of the automatic operating means and rendering the said stopping device inoperative whereby the feeding device may be manually moved indefinitely in either direction, the said feeding device and the several parts associated therewith being all carried by the turntable.

45. In a relieving lathe, the combination of means for holding and rotating a cutter, a tool holder, means for moving the tool holder toward and away from the cutter in timed relation to the rotation thereof, a device for giving the tool holder an inward feeding movement supplemental to the aforesaid normal movements, a device for feeding the tool longitudinally of the cutter, and means whereby either of the feeding devices may be made operative.

46. In a relieving lathe, the combination of means for holding and rotating a cutter, a tool holder, means for moving the tool holder toward and away from the cutter in timed relation to the rotation thereof, a device for giving the tool holder an intermittent inward feeding movement supplemental to the aforesaid normal movements, a device for continuously feeding the tool longitudinally of the cutter, and means whereby either of the feeding devices may be made operative.

47. In a relieving lathe, the combination of means for holding and rotating a cutter, a tool holder, means for moving the tool holder toward and away from the cutter in timed relation to the rotation thereof, a device for giving the tool holder an inward feeding movement supplemental to the aforesaid normal movements, means for limiting the extent of movement of the said feeding device, a device for feeding the tool longitudinally of the cutter, and means whereby either of the feeding devices may be made operative.

48. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, means for causing the forward limit of the movements toward the cutter to be advanced to effect inward feeding, means for moving the turntable and the parts carried thereby to effect longitudinal feeding, and means whereby either of the feeding means may be made operative.

49. In a relieving lathe, the combination of means for holding and rotating a cutter, a horizontal turntable, a horizontal tool carrying slide on the turntable movable toward and away from the cutter in timed relation to the rotation thereof, an element mounted for movement about the axis of the turntable, and a feeding device adapted to be actuated by the said element irrespectively of the position of the turntable.

50. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, an element supplemental to the said moving means mounted for movement about the axis of the turntable, and a feeding device adapted to be actuated by the said element irrespectively of the position of the turntable.

51. In a relieving lathe, the combination of means for holding and rotating a cutter, a horizontal turntable, a horizontal tool carrying slide on the turntable movable toward and away from the cutter in timed relation to the rotation thereof, an element mounted for oscillation about a vertical axis, and a feeding device adapted to be actuated by the said element irrespectively of the position of the turntable.

52. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, an element mounted for oscillation about the axis of the turntable, and a feeding device adapted to be actuated by the said element irrespectively of the position of the turntable.

53. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, an annular element movable about the axis of the turntable, and a feeding device adapted to be actuated by the annular element irrespectively of the position of the turntable.

54. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, an annular toothed gear mounted for movement about the axis of the turntable and exposed throughout a large portion of its periphery, a driving gear meshing with the annular gear and fixed against bodily movement with the turntable as it moves angularly, and a feeding device adapted to be actuated by the annular gear irrespectively of the position of the turntable.

55. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, an annular toothed gear mounted for movement about the axis of the turntable, and a feeding device comprising a gear meshing with the annular gear and adapted to be actuated thereby irrespectively of the position of the turntable.

56. In a relieving lathe, the combination of means for holding and rotating a cutter, a horizontal turntable, a horizontal tool carrying slide on the turntable, means operable for all positions of the turntable for moving the slide toward and away from the cutter in timed relation to the rotation thereof, an annular toothed gear mounted for movement about the axis of the turntable and exposed throughout a large portion of its periphery, a driving gear meshing with the annular gear and fixed against bodily movement with the turntable as it moves angularly, and a feeding device comprising a gear meshing with the annular gear and adapted to be actuated thereby irrespectively of the position of the turntable.

57. In a relieving lathe, the combination of means including a live spindle for holding and rotating a cutter, driving means for the spindle, including a drive shaft, two differently speeded power connections between the shaft and the spindle and a clutch whereby either of the connections may be made operative and the other inoperative at the operation of the operator, a tool holder, and means operated by the drive shaft independently of the spindle for moving the tool holder toward and away from the cutter in timed relation to the rotation thereof.

58. In a relieving lathe, the combination of means including a live spindle for holding and rotating a cutter, driving means for the spindle including a drive shaft, two differently speeded power connections between the shaft and the spindle and a clutch whereby either of the said connections may be made operative and the other inoperative at the option of the operator, a tool holder and means operated by the drive shaft independently of the spindle and including change-speed mechanism for moving the tool holder toward and away from the cutter.

59. In a relieving lathe, the combination of means including a live spindle for holding and rotating a cutter, driving means for the spindle including a transverse drive shaft, two differently speeded worm and wheel connections between the shaft and the spindle and a clutch whereby either of the connections may be made operative and the other inoperative at the option of the operator, a tool holder, and means operated by the drive shaft independently of the spindle for moving the tool holder toward and away from the cutter in timed relation to the rotation thereof.

60. In a relieving lathe, the combination of means including a live spindle for holding and rotating a cutter, driving means for the spindle including a transverse drive shaft, two differently speeded worm and wheel connections between the shaft and the spindle and a clutch whereby either of the connections may be made operative and the other inoperative at the option of the operator, a tool holder, and means operated by the drive shaft independently of the spindle and including change-speed mechanism for moving the tool holder toward and away from the cutter.

61. In a relieving lathe, the combination of a bed, a headstock provided with means for rotating a cutter, a tail-stock support positioned vertically above and parallel to the bed with its center line in the same vertical plane as the center line of the head stock, a tailstock carried by the support and adjustable therealong, the tailstock being in longitudinal alinement with the headstock, a tool holder, and means for moving the tool holder toward and away from the cutter in timed relation to the rotation thereof.

62. In a relieving lathe, the combination of a bed, a headstock provided with means for rotating a cutter, a tailstock support positioned above and parallel to the bed, a tailstock carried by the support and adjustable therealong, a supporting bracket interposed between the bed and the tailstock support and adjustable toward or away from the headstock, a tool holder, and means for moving the tool holder toward and away from the cutter in timed relation to the rotation thereof.

63. In a relieving lathe, the combination of a bed, a headstock provided with means for rotating a cutter, a tailstock support positioned above and parallel to the bed, a tailstock carried by the support and adjustable therealong, a supporting bracket interposed between the bed and the tailstock support and adjustable toward or from the headstock, a tool holding means adapted to be positioned under the tailstock and comprising a horizontal turntable and a horizontal slide on the turntable, and means operable for all positions of the turntable for moving the slide toward and away from the cutter in timed relation to the rotation thereof.

64. In a relieving lathe, the combination of a bed, a headstock provided with means for rotating a cutter, a tailstock support positioned above and parallel to the bed, the support being V-shaped in vertical transverse section, holding devices for the said support positioned near the ends thereof and provided with upward opening V-shaped notches, means for securing the support in the notches of the holding devices, a tool holder, and means for moving the tool holder toward and away frrom the cutter in timed relation to the rotation thereof.

65. In a relieving lathe, the combination of a bed, a headstock provided with means for rotating a cutter, a tailstock support positioned above and parallel to the bed, a tailstock carried by the support, a supporting bracket interposed between the bed and the tailstock support, the tailstock, tailstock support and supporting bracket being readily detachable as a unit from the other parts of the lathe, a tool holder, and means for moving the tool holder toward and away from the cutter in timed relation to the rotation thereof.

In testimony whereof, I hereto affix my signature.

FRIEDERICH MÜLLER.